Aug. 20, 1940.   W. F. MARTIN   2,212,323
CALCULATOR
Filed Jan. 15, 1940   3 Sheets-Sheet 1

INVENTOR.
WILLIAM F. MARTIN
BY
Charles R Werner
ATTORNEY.

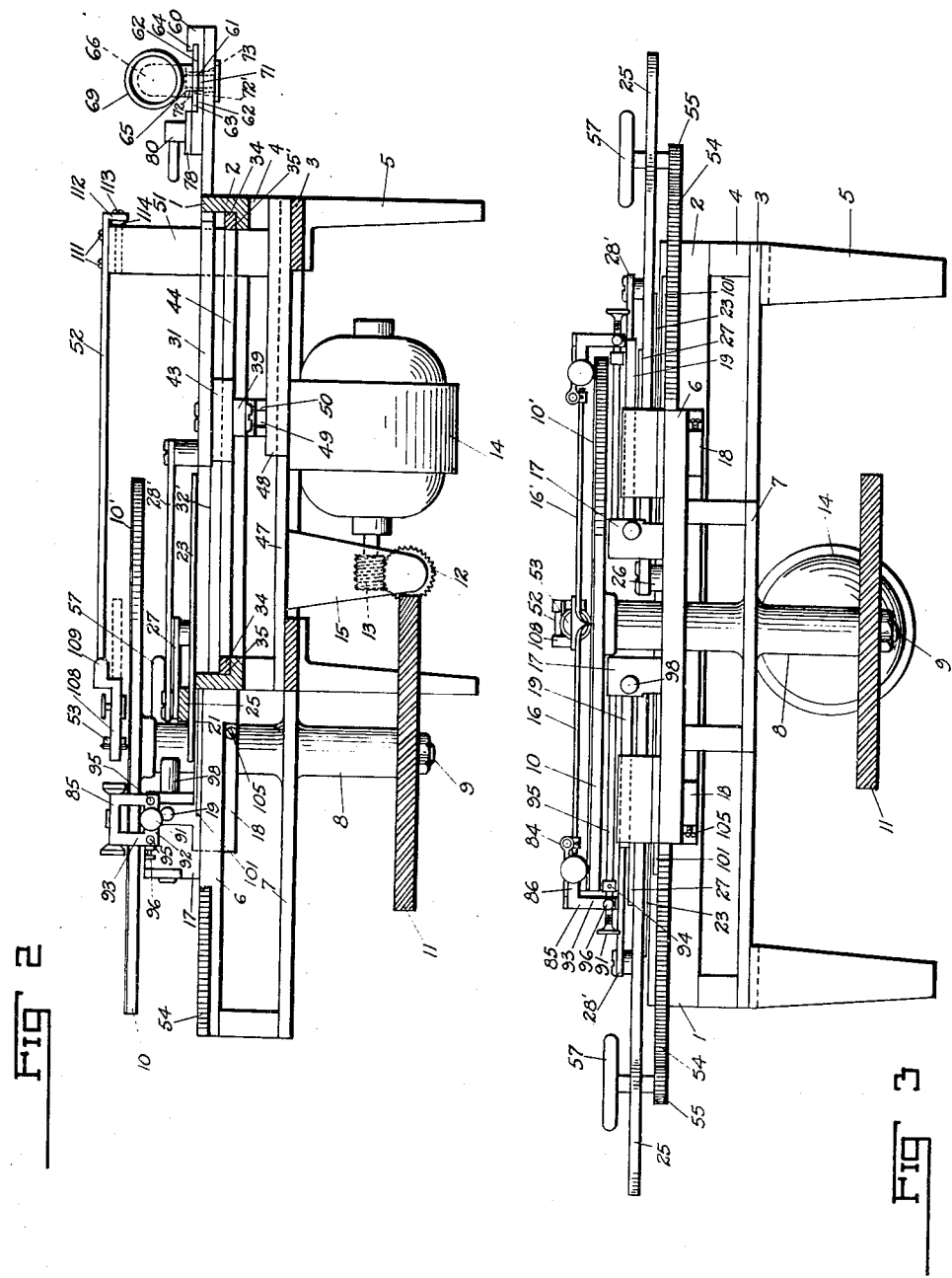

Aug. 20, 1940. W. F. MARTIN 2,212,323
CALCULATOR
Filed Jan. 15, 1940 3 Sheets-Sheet 3
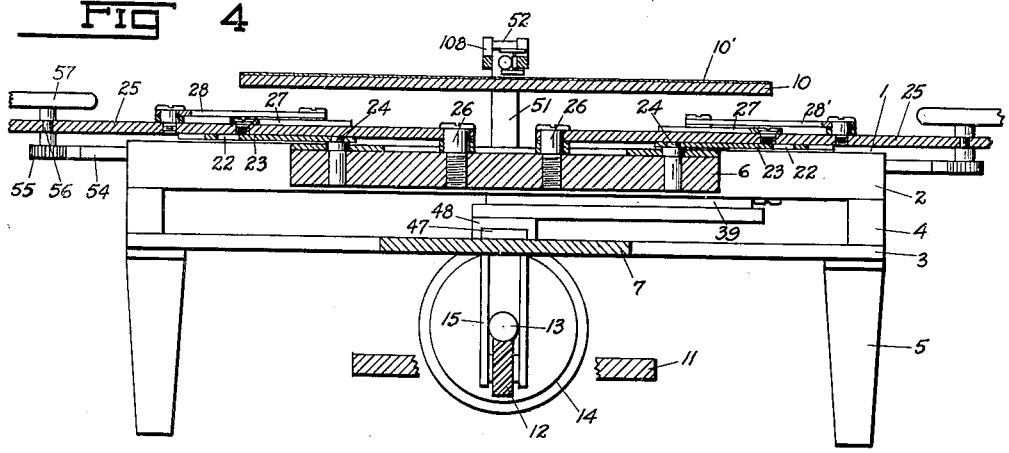
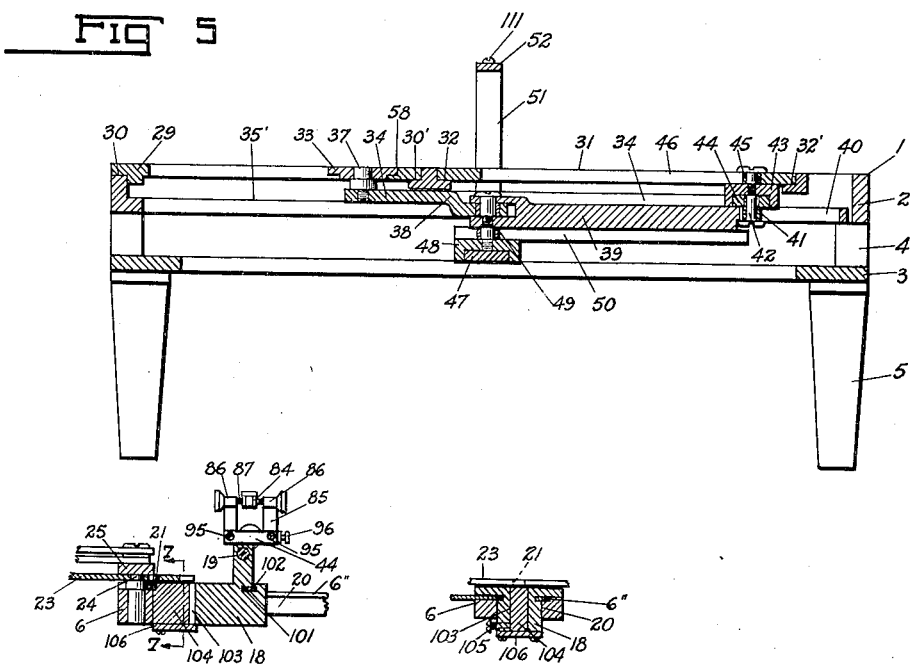
INVENTOR.
WILLIAM F. MARTIN
BY
Charles R Werner
ATTORNEY.

Patented Aug. 20, 1940

2,212,323

UNITED STATES PATENT OFFICE 2,212,323

CALCULATOR

William F. Martin, Amarillo, Tex.

Application January 15, 1940, Serial No. 313,895

20 Claims. (Cl. 235—61)

This invention relates in general to calculating machines and particularly to orifice meter chart calcuators in which an orifice meter chart is applied to a revolving chart table, the lines representing static and differential pressures are followed by styli, and apparatus actuated by movement of the styli cooperates with a counter on the chart table to produce a figure on said counter denoting actual quantity of gas or other fluid which has passed through said orifice meter.

This application is an improvement over my Patent No. 2,166,845, issued July 19, 1939, for "Calculating machines." The structure and operation has been simplified, adjustments made more accessible, and the entire device revamped, physically and in principle, to make a better operating commercial product.

In the art, prior to my invention, there has been no machine devised which would make a complete calculation to give actual figures, in quantities, of gas or other fluid passing through an orifice meter. The figures obtained by prior art devices required further multiplication by various factors to obtain a complete result.

In orifice meter chart calculation there are a number of factors to be taken into consideration upon computing actual quantities from the recordings shown on the chart. Corrections must be made for supercompressibility, size of orifice, inside pipe diameter, pressure base, flowing temperature, gravity and other items. All these items are mathematically combined and tables are made up for each meter, the figures on these tables representing the "coefficient" of the meter. The "coefficient" represents the quantity of gas (or other fluid) passing through a meter under a given set of conditions in a given time at given absolute pressure and a given differential.

Up until my invention, prior art devices calculated only the "chart extension" which is the square root of the product of the differential and the pressure. My device applies the meter coefficient to the square root of the product of the differential and the pressure and thereby obtains a reading which denotes actual quantity of gas or other fluid.

When using my machine, the chart to be computed is applied to a chart table on the machine, the "coefficient," which may be different for each chart and meter and which has been written on the chart before or after it was applied to the orifice meter or taken therefrom, is applied to the calculating process by means of "coefficient mechanism" which has a vernier adjustment to permit a very accurate setting, and after manipulation of tracing styli upon the rotating chart, a counter, also resting on the chart and actuable transversely thereof by the multiplying mechanism, registers in figures the actual quantity of gas (or other fluid) which has passed through the particular meter from which the chart was taken.

The objects of my invention are, first; to provide an orifice meter chart calculating machine to which an orifice meter chart may be applied, the lines thereon denoting static and differential pressures being traced by styli, mechanism actuated by movement of the styli which will extract the square roots of the static and differential pressures and obtain the product thereof, mechanism which may be set prior to the calculating process to inject the "coefficient" of the meter into the calculation, and a counter which will be actuated across the chart face by the movement of the styli-actuated mechanism, and which will have a rotating, chart engaging wheel, the rotations of which will indicate on the counter the quantity of gas (or other fluid) which has passed through the meter from which the chart being run was taken.

Second; to provide a device of the class described in which the counter will give a quantity reading for any time division of the chart, that is, the counter will continuously be giving a reading and the chart table may be stopped after one hours calculation or twelve hours calculation and a proper quantity reading will be available for that particular period of time.

Third; to provide in a device of the class described, styli carrying mechanism which will accurately transfer the arcuate travel of the styli tips to a linear travel for the mechanism actuated by movement of the styli.

Fourth; to provide in a device of the class described, adjustments for properly positioning the styli on the chart being computed.

Fifth; to provide in a device of the class described, adjustments between the styli carrying mechanism and the calculating mechanism actuated thereby.

Sixth; to provide in a device of the class described, a coefficient applying mechanism on one of the multiplying arm actuating members, whereby the relation of movement of said member with said multiplying arm may be changed at will.

Seventh; to provide in a device of the class described, square root extracting mechanism between each of the styli and its corresponding multiplying arm actuating mechanism.

Eighth; to provide in a device of the class described, a novel design of vernier adjustment for the coefficient mechanism.

Other objects and advantages as well as the construction and operation of my invention will be better understood by reference to the following specification in connection with the accompanying drawings in which:

Fig. 3 is a front elevational view of the device.

Fig. 4 is a transverse cross sectional view on the line 4—4 of Fig. 1.

Fig. 5 is a transverse cross sectional view on the line 5—5 of Fig. 1.

Fig. 6 is a vertical cross sectional view on the line 6—6 of Fig. 1 showing stylus assembly details.

Fig. 7 is a vertical cross sectional view on the line 7—7 of Fig. 6.

Fig. 8 is an enlarged vertical cross sectional view on the line 8—8 of Fig. 1 showing coefficient mechanism details.

Figure 1:
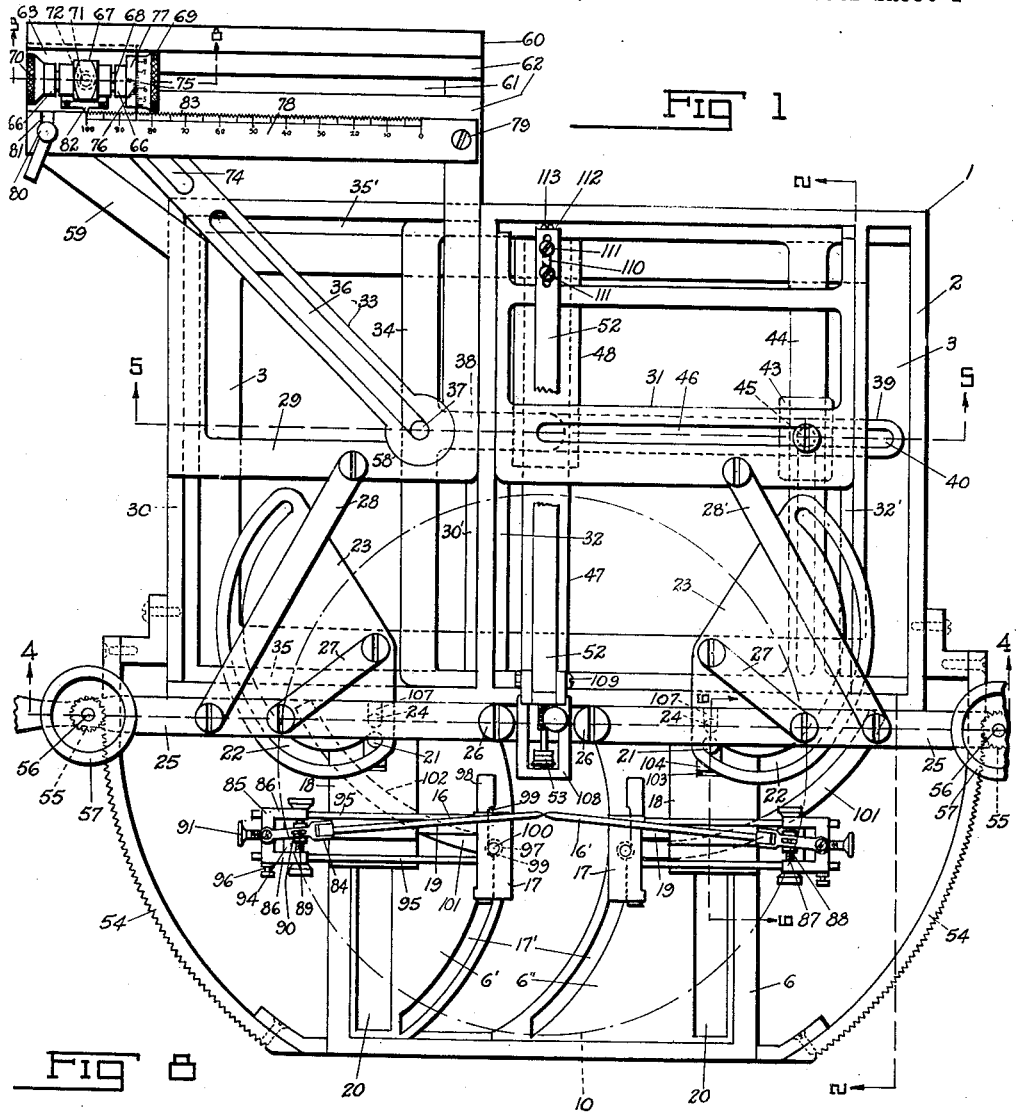
Fig. 1 is a top plan view of my device with all parts in zero or starting position, the chart table being removed and its position indicated by a broken line.
Figure 2:
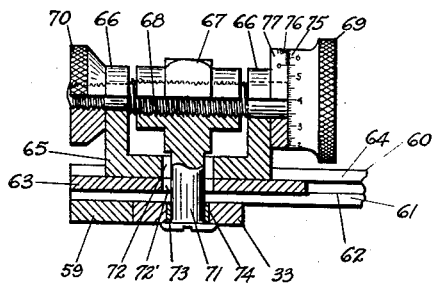
Fig. 2 is a longitudinal cross sectional view on the line 2—2 of Fig. 1.

Referring now to the drawings by numerals of reference, 1 designates a frame having upper and lower members 2 and 3, with intermediate legs 4 and frame supporting legs 5. The upper frame 2 has a front extension 6 and the lower frame 3 has a front extension 7. The lower front extension 7 carries a vertical bearing 8 in which shaft 9 is rotatably positioned, the upper end of the shaft removably carrying the rotatable chart table 10, and the lower end of the shaft 9 carrying a ring gear 11 meshing with pinion 12, rotated by worm 13, driven by motor 14 or other suitable driving means. The pinion 12 may be suitably supported by bracket 15, and the motor 14 may be carried by the frame and connected to a suitable source of power through a foot switch or any other suitable current controlling device.

The styli 16 and 16' are each indirectly connected to and adapted to move with a time arc block or head 17 slidably movable in slotted time arc guide 17' forming a part of upper front extension inserts 6' and 6''. The head 17 has a transversely sliding relation with stylus block 18 through rod 19 slidably supported in block 18 and carried by head 17. The stylus blocks 18 are slidably mounted in fore and aft guides 20 which also form a part of the upper front extension inserts 6' and 6'', said inserts being secured to the front extension 6.

The stylus blocks 18 carry rollers 21 which engage arcuated slot 22 of square root extracting members 23 which in turn are pivoted at 24 to the upper front frame extension 6.

Handles 25 are pivoted to the frame extension 6 at 26 and short links or levers 27 are pivotally connected between the handles 25 and the square root extracting members 23. Longer links or levers 28 and 28' are pivotally connected at one end to the handles 25. The other end of lever 28 is pivotally secured to fore and aft sliding frame 29 which is slidably positioned on guides 30 and 30' of upper frame 2. The sliding frame 29 carries the coefficient mechanism which will be described in detail hereinafter. The lever 28' has its other end pivotally connected to a second fore and aft sliding frame 31 which is slidably positioned on guides 32 and 32'.

A coefficient arm 33 is adjustably carried by sliding frame 29 and is adapted to impart transverse movement to transversely slidably frame 34 slidably mounted on guides 35 and 35', of frame 2, said arm 33 having a slot 36 in which roller 37 rides, the roller being carried by transversely movable frame 34. This frame 34 also carries a fixed arm 38 to which multiplying lever 39 is pivotally secured, said multiplying lever moving transversely of the machine simultaneously with transverse movement of the frame 34.

The multiplying lever 39 has a slot 40 in which is positioned roller 41 on pin 42 carried by inverted U-head 43 slidably positioned on fore and aft guide 44 which is a part of transversely sliding frame 34. (See Fig. 5.) Fore and aft movement of the U-head 43 is governed by movement of the fore and aft sliding frame 31, the pin 42 also carrying a roller 45 positioned in slot 46 of the sliding frame 31. Therefore, fore and aft movement of the frame 31 will rock the multiplying lever 39 on its pivot. Fore and aft movement of sliding frame 29 will change the transverse relation of the multiplying lever 39 to the sliding frame 31.

Positioned fore and aft of the machine and secured to the lower frame 3 as an integral part thereof is a guide bar 47 on which is slidably mounted an inverted U-shaped carriage 48 at the forward end of which is a roller 49 adapted to work in groove 50 in the underside of multiplying lever 39.

The rear end of the carriage 48 carries a vertical post or support 51 to which is adjustably secured the counter arm 52, the forward end of which carries the counter 53 in hinged relation thereto so that the counter may freely rest on the chart 10'.

The handles 25 may be used for primary setting or rapid movement of the styli. For vernier or slower movement I have provided arcuate racks 54, meshing with pinions 55, carried by shaft 56, journaled in handles 25 and having a knob or handwheel 57 by means of which pinions 55 may be rotated to ride the racks 54.

*Coefficient setting mechanism*

As heretofore related, the coefficient arm 33 is an adjustable part of sliding frame 29, said arm having one end suitably pivoted to frame 29 at 58. The rear end of frame 29 is widened by means of diagonal arm 59 and carries a transverse guide 60 having slot 61 and track 62. A flat plate 63 is adapted to ride track 62 and is normally retained on the track by overlapping shoulder 64. A U-shaped yoke 65 is secured to the plate 63 and between the upstanding arms 66 of the yoke is positioned a head 67 threadedly supported on the screw 68, freely turning in the arms 66 and carrying at one end a vernier calibrated knob 69 and at the other end a lock nut 70. The head 67 has a depending pin 71 which passes through an enlarged opening 72 in the yoke 65 and through enlarged opening 72' in plate 63, and carries a roller 73 engaging slot 74 of coefficient arm 33. The knob 69 is provided with calibrations 75 which, in conjunction with calibrations 76 on a disc 77 secured to one of the arms 66, provides for vernier setting of the coefficient mechanism.

For a rough adjustment or primary setting I have provided a calibrated scale member 78, pivoted at 79 to sliding frame 29 and adapted to have its other end securely held in place by lock screw 80 threaded to the frame 29 and working in slot 81 of the scale member 78. The flat plate 63 carries a detent 82 adapted to engage one of the notches 83 forming a part of the calibrated scale member 78.

In setting the coefficient mechanism, the coefficient is noted on the chart or taken from a suitable scale, and for example, it is assumed to be 9072. The lock screw 80 is loosened, the scale member 78 swung on its pivot to clear the detent 82 and the head 67 is moved until the detent 82 is adjacent the notch representing the figure "90" on the scale member. Movement of the head 67 will cause a swinging movement of coefficient arm 33 by virtue of roller 73 bearing in slot 74 of said coefficient arm. The scale member 78 is swung rearwardly and firmly urged against the detent 82, and the lock screw 80 tightened to securely hold the detent engaged in the notch and the plate 63 secure against movement on its track.

The vernier is so designed that one revolution of the calibrated knob 69 equals 1.0 or the distance between each notch on the scale member 78. Therefore, to complete the setting of the mechanism to a coefficient of 9072., the knob 69 is turned until the line representing "72" thereon coincides with the "0" on the short scale or calibrations 76. The setting may be made to one more place if need be. The lock nut 70 is turned up to securely hold the vernier setting means in adjusted position.

Styli mechanism

Since the styli 16 and 16' and their associated adjusting and operating means are substantially the same except that one is right hand and the other is left hand, only one assembly will be described, the other being given like numerals of reference.

One end of the stylus 16 is hinged to a forked arm 84 so that the other end of the stylus may rest freely on the chart 10'. The arm 84 is pivoted to an adjustment frame 85 having lateral arms 86 which carry adjusting screw 87 threadedly engaging block 88 having pin 89 working in slot 90 of forked arm 84. Rotation of the screw 87 will move block 88 to swing stylus 16 one way or the other for setting the point thereof to "0" on the chart when commencing calculation. Also used for "0" adjustment of the stylus is adjusting screw 91, threadedly engaged in cross bar 92, carried by depending arms 93 of adjustment frame 85. The adjusting screw 91 is rotatably secured to cross arm 94 which is rigidly carried by rods 95 on which adjustment frame 85 slides as screw 91 is rotated. This will provide for adjustment of the styli transversely of the fore and aft center line of the machine. A lock screw 96 may be turned up to bear against one of the rods 95 to retain the stylus in adjusted position.

The rods 95 are rigidly secured to time arc block or head 17 which as hereinbefore related is slidably movable in slotted time arc guide by means of roller 97 working in slot 17'. Therefore, the ends of the styli 16 and 16' will follow a curve corresponding to the curve of the guides or slots 17'. These guides which are part of the inserts 6' and 6'' may be changed by removing the interchangeable inserts for computing different charts with different time arc curves.

In transmitting the curved movement of the stylus to a linear movement of the stylus block 18 it is necessary to provide means for causing both the block and its related stylus to move the same distance although in different paths. This is accomplished by providing a sliding relation between the stylus assembly and the stylus block 18. The rod 19, which is transversely slidable in stylus block 18, is secured to a shaft 98 slidably mounted in time arc head 17, the sliding movement of said shaft 98 being limited by stops created by shoulders 99 on shaft 98, said shoulders being adapted to abut the pin 100 passing through the head 17 and carrying roller 97.

The lower end of pin 100 pivotally carries an arcuate lever 101 which is adapted to slide in curved groove 102 in stylus block 18. This lever is fundamentally the element which causes equal movement of the stylus block and the stylus, since the forward movement of the stylus block 18 will cause forward movement of the time arc head 17 through the arcuate lever 101, the speed of movement of the head 17 being slower than that of the stylus block 18 but the distance traveled being the same. The curve of the arcuate lever 101 is the same as that of the slotted time arc guide 17'. It will be seen that as the head 17 and block 18 move, the fore and aft relation of the shaft 98 to the head 17 will change as will the fore and aft relation of the head 17 to the block 18.

The stylus block 18 has a slotted opening 103, in which is adjustably positioned the auxiliary block 104, and lock screw 105 threaded to block 18 providing for securing the block 104 in adjusted position. The block 104 may rest on a plate 106 and carries the roller 21 which engages the slot 22 in the square root extracting member. The blocks 104 are notched at 107 to clear the pivot 24 of the square root extracting members. Setting of the auxiliary block 104 will provide for fore and aft adjustment of the styli.

Counter and adjustment

The counter 53 is substantially of standard integrator design and is suitably assembled in a frame 108 hinged to the counter arm 52 at 109. The other end of the arm 52 is provided with a slot 110 in which lock screws 111 are positioned. An arm or bracket 112 depends from the end of the arm 52 and carries adjusting screw 113 with collar 114. Rotation of the screw 113 will shift the arm 52 with respect to the post 51 to provide for adjustment and setting of the counter 53.

Operation

In operation, my calculating machine functions as follows:

The chart 10' is placed on the chart table 10 which may be provided with an anti-slipping surface, the chart preferably being set with the zero time arc at the starting point, that is, where the styli points meet, said styli being adjusted to the particular chart being calculated so as to set at zero with the other moving parts of the machine at zero or starting position. It must be understood that adjustments are not necessary every time a chart is run, it being necessary only to change the settings of the styli when charts of different character are being calculated.

The "meter coefficient," which has been written on the chart, is noted and the coefficient mechanism is set to include the coefficient in the calculation. As hereinbefore described this is accomplished by setting the detent 82 in a desired notch in scale member 78 and adjusting the vernier knob 69 for more accurate adjustment, this adjustment procedure moving coefficient arm 33 on its pivot and adapted to provide for a change in the length of travel of the transversely slidable frame 34. It is also necessary to see that the counter 53 is set at zero before starting calculation.

With all adjustments completed the machine is ready for the calculation procedure. The reading on the counter is noted so that it may be subtracted from the final reading obtained after the chart has been run to ascertain the actual chart total.

The styli may be quickly set to the static and pressure lines by grasping and moving the handles 25, the knobs 57 being used thereafter for fine adjustment or slower movement of the styli.

Since the handles 25 are adapted to simultaneously move the fore and aft sliding frames 29 and 31 through links 28 and 28', and the styli 16 and 16' through the square root extracting members 23, it will be obvious that the frames will move distances equal to the square root of their respective styli when the coefficient equals 1.0000. In other words, the average square root of the static will be multiplied by the average square root of the differential when the coefficient equals 1.0000.

Fore and aft movement of the sliding frame 29 will cause a proportionate transverse movement of the sliding frame 34, the proportion of movement being governed by the position of the coefficient arm 33. Transverse movement of the frame 34 will move the multiplying lever 39 transversely and cause a change in the relation of the multiplying lever to the second fore and aft sliding frame 31, the roller 45 moving transversely in slot 46 of frame 31.

Movement of the multiplying lever 39 is imparted to the counter 53 through roller 49 in groove 50, said roller being on carriage 48 which supports the counter arm 52 and counter 53. It must be noted, however, that no movement will be imparted to the counter if either stylus and its sliding frame remains in zero position.

As long as both styli are off of zero position, movement of either or both styli will cause a transverse and/or pivotal movement of the multiplying lever to cause a proportionate fore and aft movement of the counter on the chart.

Obviously, the chart table must be rotated during the calculation by starting the electric motor, and after one complete revolution thereof, or any time prior thereto, the chart table may be stopped and the reading on the counter noted, subtraction of the former reading therefrom giving an actual quantity reading of gas or other fluid which has passed through the orifice meter from which the chart was taken, during a certain period of time.

What I claim as new and desire to secure by Letters Patent is:

1. A calculating machine of the class described comprising a chart table adapted to receive an orifice meter chart, styli adapted to follow line recordings on the chart, a multiplying means responsive indirectly to movements of the styli, square root extracting means between each stylus and the multiplying means, and a counting device engaging the chart table and actuated thereby and movable diametrically across the chart by multiplying movement of the multiplying means.

2. A calculating machine of the class described comprising a chart table adapted to receive an orifice meter chart, styli adapted to follow line recordings on the chart, actuating means for each stylus, a multiplying means movable by the styli actuating means, square root extracting means between each stylus and its actuating means, and a counting device engaging the chart table and actuated thereby and movable diametrically acros the chart by multiplying movement of the multiplying means.

3. A calculating machine of the class described comprising a chart table adapted to receive an orifice meter chart, styli adapted to follow line recordings on the chart, actuating means for each stylus, a multiplying means movable by the styli actuating means, square root extracting means between each stylus and its actuating means, and a counting device engaging the chart table and actuated thereby and movable diametrically across the chart by multiplying movement of the multiplying means, said square root extracting means including arcuate guides so laid out and related to the styli as to impart to said styli movement proportionate to the movement of the multiplying means.

4. A calculating machine of the class described comprising a chart table adapted to receive an orifice meter chart, styli adapted to follow line recordings on the chart, an operating lever for each stylus, a square root extracting means linked to each lever and adapted to actuate its corresponding stylus upon movement of the lever, multiplying means linked to the operating levers, movement of either, or both levers causing simultaneous and proportionate movement of the multiplying means and corresponding stylus, or both styli, and a counting device engaging the chart table and actuated thereby and movable diametrically across the chart by multiplying movement of the multiplying means.

5. A calculating machine of the class described comprising a chart table adapted to receive an orifice meter chart, styli adapted to follow line recordings on the chart, an operating lever for each stylus, a square root extracting means linked to each lever and adapted to actuate its corresponding stylus upon movement of the lever, multiplying means comprising a fore and aft slidable member for each stylus, a transversely slidable member actuated by movement of one of the fore and aft slidable members, a pivoted multiplying member carried by the transversely slidable member, the other fore and aft slidable member being adapted to cause pivotal movement of the multiplying member, each of said operating levers being linked to a fore and aft sliding member, movement of either, or both levers causing simultaneous and proportionate movement of its corresponding, or both fore and aft sliding members and styli, and a counting device engaging the chart table and actuated thereby and movable diametically across the chart by multiplying movement of the multiplying member.

6. A calculating machine of the class described comprising a chart table adapted to receive an orifice meter chart, styli adapted to follow line recordings on the chart, sliding stylus blocks carrying the styli, actuating means for each stylus block, a multiplying means actuable by the stylus block actuating means, square root extracting means between each stylus block and its actuating means, and a counting device engaging the chart table and actuated thereby and movable diametrically across the chart by multiplying movement of the multiplying means, said square root extracting means including arcuate guides so laid out and slidably related to the stylus blocks as to impart to said blocks movement proportionate to the movement of the multiplying means.

7. A calculating machine of the class described comprising a frame, a chart table rotatably mounted on the frame and adapted to receive an orifice meter chart, styli adapted to follow line recordings on the chart, stylus blocks slidably mounted on the frame and carrying the styli, a pivoted operating lever for each stylus, a square root extracting member for each stylus, said square root extracting members being pivoted to the frame and linked to their respective operating levers, an arcuate groove of predetermined curvature in each square root extracting member, said stylus blocks being slidably related to the grooves whereby the stylus blocks will be imparted a rectilinear movement upon pivotal movement of the levers and the square root extracting members, a multiplying means responsive indirectly to movements of the styli, and a counting device engaging the chart table and actuated thereby and movable diametrically across the chart by multiplying movement of the multiplying means.

8. A calculating machine of the class described comprising a chart table adapted to receive an orifice meter chart, styli adapted to follow line recordings on the chart, a multiplying means responsive indirectly to movements of the styli, square root extracting means between each stylus and the multiplying means, a coefficient means for introducing a predetermined percentage into the calculation, and a counting device engaging the chart table and actuated thereby and movable diametrically across the chart by multiplying movement of the multiplying means.

9. A calculating machine of the class described comprising a chart table adapted to receive an orifice meter chart, styli adapted to follow line recordings on the chart, a multiplying means responsive indirectly to movements of the styli, square root extracting means between each stylus and the multiplying means, said multiplying means including a coefficient means for introducing a predetermined percentage into the calculation and a counting device engaging the chart table and actuated thereby and movable diametrically across the chart by multiplying movement of the multiplying means.

10. A calculating machine of the class described comprising a chart table adapted to receive an orifice meter chart, styli adapted to follow line recordings on the chart, a multiplying means responsive indirectly to movements of the styli, square root extracting means between each stylus and the multiplying means, a coefficient means for introducing a predetermined percentage into the calculation, said coefficient means including a pivoted, slotted lever adapted to be set at a predetermined angle, and a counting device engaging the chart table and actuated thereby and movable diametrically across the chart by multiplying movement of the multiplying means.

11. A calculating machine of the class described comprising a chart table adapted to receive an orifice meter chart, styli adapted to follow line recordings on the chart, actuating means for each stylus, square root extracting means between each stylus and its actuating means, multiplying means comprising a fore and aft slidable member for each stylus, a transversely slidable member actuated by movement of one of the fore and aft slidable members, a pivoted multiplying member carried by the transversely slidable member and adapted to be pivotally moved by the other fore and aft slidable member, the first mentioned fore and aft slidable member carrying coefficient means for introducing a predetermined percentage into the calculation, said multiplying means being actuated by movement of the stylus actuating means, and a counting device engaging the chart table and actuated thereby and movable diametrically across the chart by multiplying movement of the multiplying member.

12. A calculating machine of the class described comprising a chart table adapted to receive an orifice meter chart, styli adapted to follow line recordings on the chart, actuating means for each stylus, square root extracting means between each stylus and its actuating means, multiplying means comprising a fore and aft slidable member for each stylus, a transversely slidable member actuated by movement of one of the fore and aft slidable members, a pivoted multiplying member carried by the transversely slidable member and adapted to be pivotally moved by the other fore and aft slidable member, the first mentioned fore and aft slidable member carrying an adjustable slotted member adapted to be set at a predetermined angle, said transversely slidable member being slidably connected with the slotted member whereby the adjustment of the slotted member will determine the percentage of movement of the transversely slidable member, said multiplying means being actuated by movement of the stylus actuating means, and a counting device engaging the chart table and actuated thereby and movable diametrically across the chart by multiplying movement of the multiplying means.

13. A calculating machine of the class described comprising a chart table adapted to receive an orifice meter chart, styli adapted to follow line recordings on the chart, a multiplying means responsive indirectly to movements of the styli, square root extracting means between each stylus and the multiplying means, a coefficient means for introducing a predetermined percentage into the calculation, and a counting device engaging the chart table and actuated thereby and movable diametrically across the chart by multiplying movement of the multiplying means, said coefficient means comprising a slotted lever pivoted at one end thereof, a detent slidably carried at the other end of the lever, a calibrated member adapted to be engaged by the detent, and means for locking the detent at any desired relation to the calibrated member.

14. A calculating machine of the class described comprising a chart table adapted to receive an orifice meter chart, styli adapted to follow line recordings on the chart, a multiplying means responsive indirectly to movements of the styli, square root extracting means between each stylus and the multiplying means, a coefficient means for introducing a predetermined percentage into the calculation, and a counting device engaging the chart table and actuated thereby and movable diametrically across the chart by multiplying movement of the multiplying means, said coefficient means comprising a slotted lever pivoted at one end thereof, a transverse guide at the other end of the lever, an adjustment head slidably positioned in said guide, a detent block adjustably carried by said head and slidably related to the lever, a calibrated member adapted to be engaged by said detent block, means for locking the detent block at any desired relation to the calibrated member, and means on the head for a limited adjustment of the detent block on the head for vernier setting of the lever.

15. A calculating machine of the class described comprising a chart table adapted to receive an orifice meter chart, styli adapted to follow line recordings on the chart, actuating means for each stylus, square root extracting means between each stylus and its actuating means, multiplying means comprising a fore and aft slidable member for each stylus, a transversely slidable member actuated by movement of one of the fore and aft slidable members, a pivoted multiplying member carried by the transversely slidable member and adapted to be pivotally moved by the other fore and aft slidable member, adjustable coefficient means between the first mentioned fore and aft slidable member and the transversely slidable member whereby the relation of movement between said members may be varied by setting of said coefficient means, said multiplying means being actuated by movement of the stylus actuating means, and a counting device engaging the chart table and actuated thereby and movable diametrically across the chart by multiplying movement of the multiplying member.

16. A calculating machine of the class described comprising a chart table adapted to receive an orifice meter chart, styli adapted to follow line recordings on the chart, an operating lever for each stylus, an arcuate rack for each lever, a pinion carried by each lever and engaging the rack, a knob for rotating the pinion and causing pivotal movement of the lever, a square root extracting means linked to each lever and adapted to actuate its corresponding stylus upon movement of the lever, multiplying means linked to the operating levers, and a counting device engaging the chart table and actuated thereby and movable diametrically across the chart by multiplying movement of the multiplying means.

17. A calculating machine of the class described comprising a chart table adapted to receive an orifice meter chart, styli mechanism carrying styli adapted to follow line recordings on the chart, said styli mechanism for each stylus including a stylus block, a rectilinear guide for said block, a stylus head, an arcuate guide for said head, a guide rod carried by the head and slidably related to the block, supporting rods secured to the head and adjustably carrying a stylus frame, said stylus being adjustably carried in the stylus frame, a multiplying means responsive indirectly to movements of the styli, square root extracting means between each stylus mechanism and the multiplying means, and a counting device engaging the chart table and actuated thereby and movable diametrically across the chart by multiplying movement of the multiplying means.

18. A calculating machine of the class described comprising a chart table adapted to receive an orifice meter chart, styli mechanism below the chart table carrying styli adapted to follow line recordings on the chart, said styli mechanism for each stylus including a stylus block, a rectilinear guide for said block, a stylus head, an arcuate guide for said head, a guide rod carried by said head and slidably related to the block, supporting rods secured to the head and extending toward the periphery of the chart table, a stylus frame adjustably carried by the supporting rods and extending beyond the periphery of and above the top of the chart table, said stylus being adjustably carried in the stylus frame and extending inwardly from the periphery of the chart table, a multiplying means responsive indirectly to movements of the styli, square root extracting means between each stylus mechanism and the multiplying means, and a counting device engaging the chart table and actuated thereby and movable diametrically across the chart by multiplying movement of the multiplying means.

19. A calculating machine of the class described comprising a chart table adapted to receive an orifice meter chart, styli adapted to follow line recordings on the chart, a multiplying means responsive indirectly to movements of the styli, square root extracting means between each stylus and the multiplying means, a counting device carriage arranged for rectilinear movement, a counting device supported by the carriage and engaging the chart table, said carriage being actuated by multiplying movement of the multiplying means to move the counting device diametrically across the chart, said counting device being actuable by rotation of the chart table.

20. A calculating machine of the class described comprising a chart table adapted to receive an orifice meter chart, styli adapted to follow line recordings on the chart, a multiplying means responsive indirectly to movements of the styli, square root extracting means between each stylus and the multiplying means, said multiplying means including a pivoted multiplying member, a counting device carriage arranged for rectilinear movement, a counting device supported by the carriage and engaging the chart table, said carriage slidably engaging the multiplying member and adapted to move linearly upon multiplying movement of the multiplying member to move the counting device diametrically across the chart table, said counting device being actuable by rotation of the chart table.

WILLIAM F. MARTIN.